Aug. 21, 1945.  E. N. CAVERT  2,383,042
REVOLVING REFLECTOR
Filed Nov. 20, 1943  2 Sheets-Sheet 1
Fig.1.
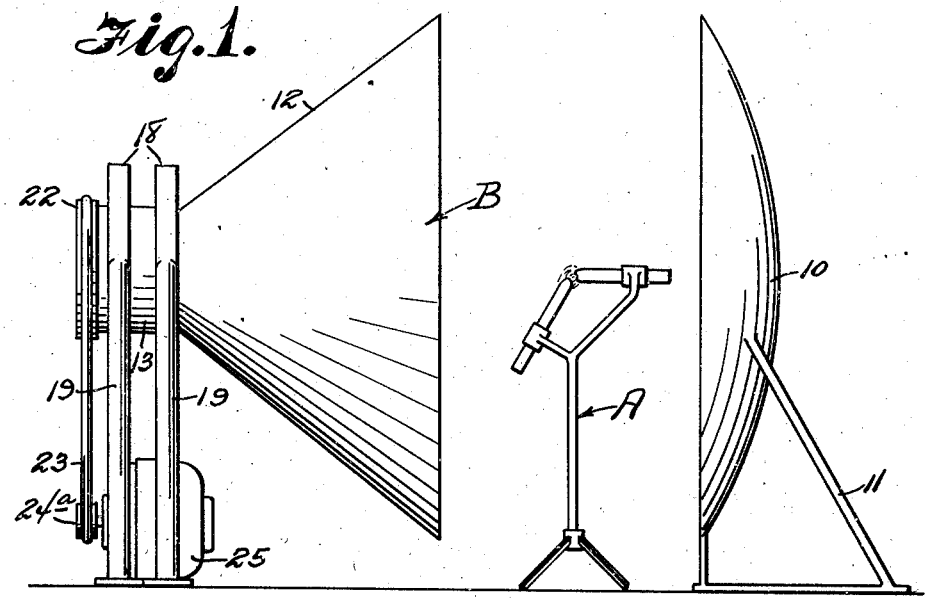
Fig.4.  Fig.2.  Fig.5.
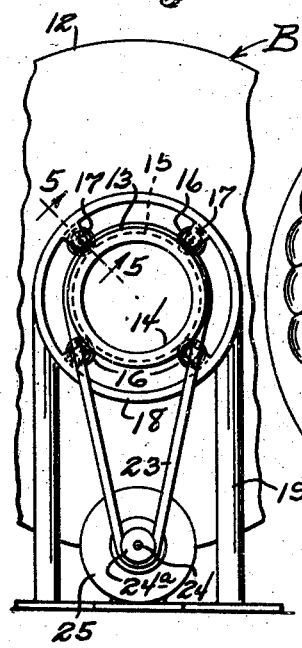 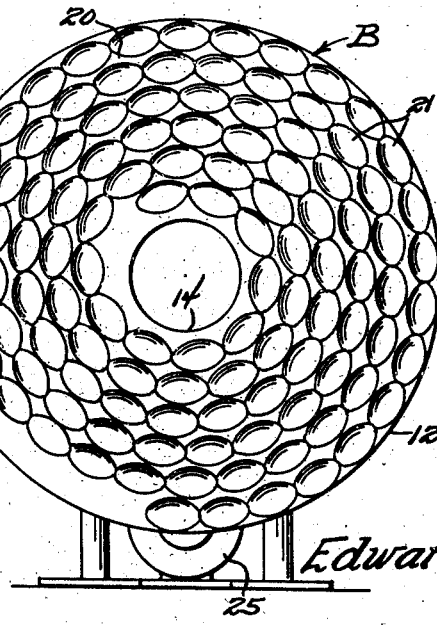 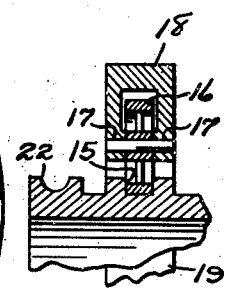
Edward N. Cavert
INVENTOR.
BY
Victor J. Evans & Co.
ATTORNEYS

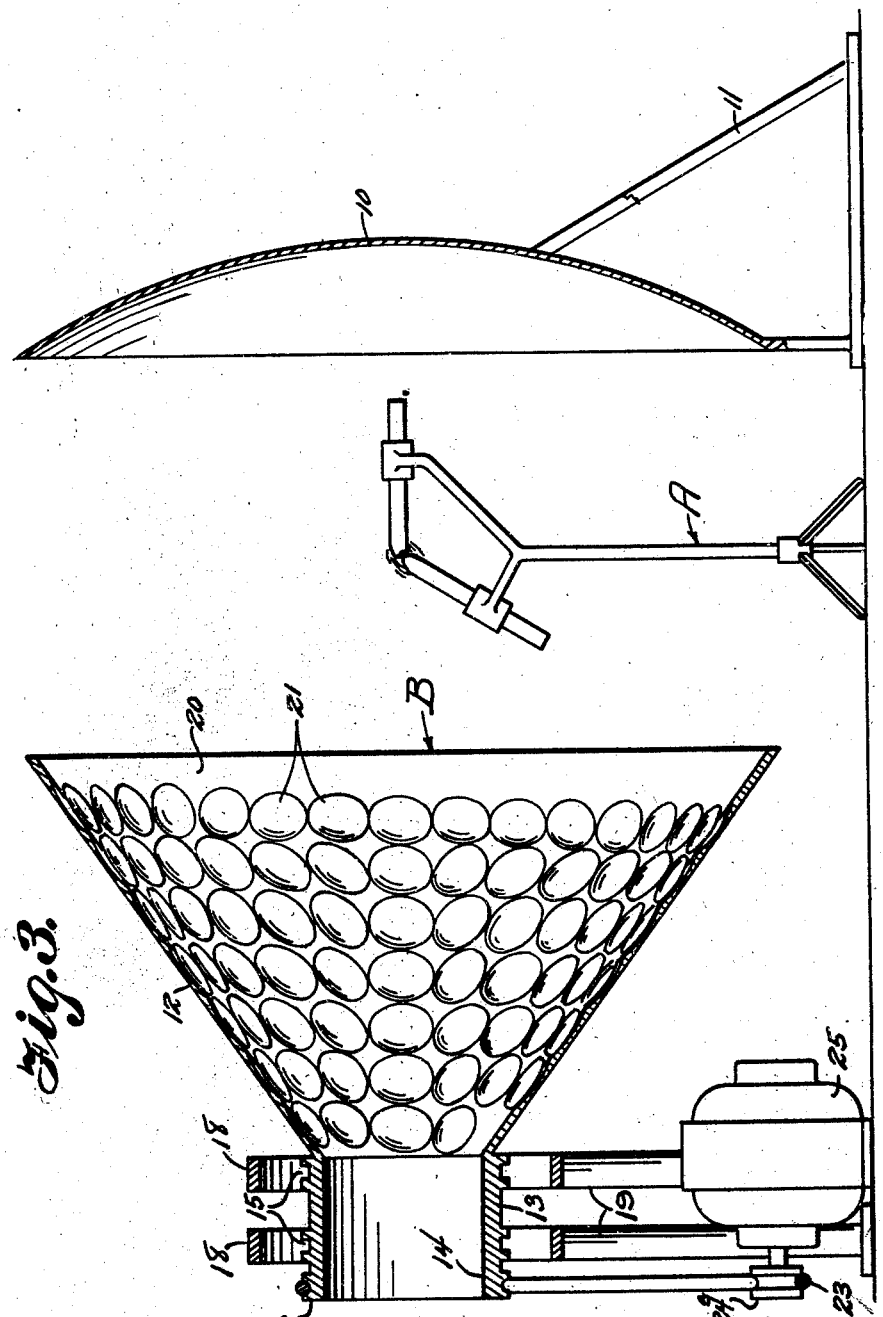

Patented Aug. 21, 1945

2,383,042

UNITED STATES PATENT OFFICE 2,383,042

REVOLVING REFLECTOR

Edward N. Cavert, North Hollywood, Calif.

Application November 20, 1943, Serial No. 511,137

1 Claim. (Cl. 240—10.1)

The invention relates to a reflector and more particularly to a revolving reflex action reflector.

The primary object of the invention is the provision of a reflector of this character, wherein light rays from an original source of light, such as a conventional arc-light or illuminating bulb, strike a rear reflector from which they are thrown forwardly to a point where they are picked up by miniature reflectors spirally arranged so that the light reflexes thrown back to the rear reflector and then projected forwardly therefrom form a beam of light useful as a search-light or for other purposes.

Another object of the invention is the provision of a reflector of this character, wherein the miniature reflectors are revolved under any speed and will cause to cast a strong light concentrated at a determined point forwardly of the said reflector.

A further object of the invention is the provision of a reflector of this character, wherein the miniature reflectors are disposed on a concavo-convexed member or a truncated cone, which latter is rotated, so that reflection occurs spirally, and a concentrated beam of light can be thrown forwardly through a center opening in this member or cone for projection and service at any point required or desired.

A still further object of the invention is the provision of a reflector of this character, which is simple in construction, thoroughly reliable and efficient in operation, possessed of maximum reflection qualities, strong, durable, portable, readily and easily operated, and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and pointed out in the claim hereunto appended.

In the accompanying drawings:

Figure 1 is a side view showing the reflector constructed in accordance with the invention set up for service.

Figure 2 is a front elevation of the same.

Figure 3 is a vertical longitudinal section view thereof.

Figure 4 is a fragmentary rear elevation of the reflector.

Figure 5 is a fragmentary sectional view taken on the line 5—5 of Figure 4, looking in the direction of the arrows.

Similar reference characters indicate corresponding parts throughout the several views in the drawings.

Referring to the drawings in detail, A designates generally a light source, in this instance, it is an electric arc-light, although it may be of the electric bulb type, and disposed at one side or the rear thereof is a concavo-convexed reflector mirror 10, which is vertically disposed upon a support 11, so that the light source will be centered with respect thereto.

At the other side or front of the light source A and centered with respect thereto is a revolving reflector B which constitutes the present invention, and comprises a truncated cone 12, having at its center truncation a cylindrical barrel-like extension 13 creating a light projecting opening 14 therethrough. This extension 13 has exteriorly formed thereon wheel tracking grooves 15 annually about the same, in which travel wheels or rollers 16, these being arranged at four-points concentrically of the said extension and are journaled in bearings 17 formed on annular heads 18 of companion standards 19, which are arranged in close but spaced relation to each other longitudinally of the extension 13 for properly supporting the reflector B.

The reflector face 20 of the cone 12 has formed thereon multiple or series of circular shaped concaved reflection spots 21, each series being arranged in an annular course in juxta-position to another circumferentially of the said face 20, while the juxtabasal series of such spots lie concentric to the opening 14.

The barrel-like extension 13 is provided with a pulley formation 22 having trained thereover an endless belt 23, which also is trained over a pulley 24ª fixed to the driving shaft 24 of an electric power motor 25, so that the reflector B can be driven from the rotating shaft of the motor.

As before stated the spots 21 are arranged in annular rows, uniformly sized with respect to each other, and are also disposed in radial rows from the smaller area of the cone 12 to the larger area thereof, this latter area being in confronting relation to the light-source.

In the use of the reflector B the same is positioned with respect to the light-source A, while the reflector mirror 10 is also positioned relative thereto as shown in Figure 3 of the drawings, so that when the light-source A is turned on the light rays therefrom will be diverged onto the reflector mirror 10, whence such light will travel therefrom onto the spots 21, these in turn reflecting such light back to the reflector mirror 10 to concentrate the beam of light therefrom through the opening 14 for the projection or casting thereof to any determined point.

By rotating the reflector B the light is picked up by the spots 21 to reflect such light spirally back to the center of the mirror 10, where the light is cast or projected through the opening 14 at the center of the reflector B, the changing of the speed of rotation of the latter being effective for altering the amount of light projected through the opening 14 centrally of the said reflector B.

It is of course understood that the principle of a revolving reflex reflection may be applicable to many purposes and therefore, changes, variations and modifications are contemplated in the invention within the scope of the claim hereunto appended.

From the foregoing description taken in connection with the accompanying drawings, it will be apparent that I have provided a rotatable hollow cone having miniature reflectors so arranged therein that a reflex action takes place which causes an intense beam of light to be projected. The cone may be rotated by the means shown or by any other suitable means.

What is claimed is:

The combination of a source of light, a concavo-convexed reflector centered with respect to and spaced rearwardly from said light source, a conical shaped reflector centered with respect to and spaced forwardly from said light and tapered towards its front end, a tubular light emitting neck extruding forwardly from the small end of the conical reflector, a series of concavities on the inner reflection surface of said last mentioned reflector, the said concavities being arranged in rows annularly and radially of the said surface, and means for rotatively supporting the last mentioned reflector including standards having heads extending about said neck and rollers interposed between the heads and the neck of the last mentioned reflector.

EDWARD N. CAVERT.